(12) United States Patent
Kim et al.

(10) Patent No.: US 9,914,080 B2
(45) Date of Patent: Mar. 13, 2018

(54) FUEL FILTER FOR VEHICLE

(71) Applicants: Hyundai Motor Company, Seoul (KR); Kia Motors Corporation, Seoul (KR)

(72) Inventors: Chang Han Kim, Gwangju (KR); Myeong Hwan Kim, Hwaseong-si (KR); Jae Min Lee, Gongju-si (KR); Jae Hwa Park, Suwon-si (KR); Jong Sup Choi, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 97 days.

(21) Appl. No.: 14/979,107

(22) Filed: Dec. 22, 2015

(65) Prior Publication Data

US 2016/0361672 A1  Dec. 15, 2016

(30) Foreign Application Priority Data

Jun. 12, 2015 (KR) .......................... 10-2015-0083181

(51) Int. Cl.
| | | |
|---|---|---|
| *B01D 35/30* | (2006.01) | |
| *F02M 37/22* | (2006.01) | |
| *B01D 29/58* | (2006.01) | |
| *B01D 35/00* | (2006.01) | |
| *B01D 29/52* | (2006.01) | |
| *B01D 29/56* | (2006.01) | |
| *B01D 29/11* | (2006.01) | |

(52) U.S. Cl.
CPC .......... *B01D 35/301* (2013.01); *B01D 29/112* (2013.01); *B01D 29/114* (2013.01); *B01D 29/52* (2013.01); *B01D 29/56* (2013.01); *B01D 29/58* (2013.01); *B01D 35/005* (2013.01); *F02M 37/22* (2013.01)

(58) Field of Classification Search
CPC .... B01D 35/301; B01D 29/114; B01D 29/58; B01D 29/112; B01D 35/005; B01D 29/52; B01D 29/56; F02M 37/22
USPC ......... 210/167.01, 167.02, 167.04, 252, 253, 210/261, 262, 314, 316, 335, 337, 338, 210/342, 416.5, 446, DIG. 17
See application file for complete search history.

(56) References Cited

U.S. PATENT DOCUMENTS

| | | | |
|---|---|---|---|
| 4,944,876 A * | 7/1990 | Miller | .................... B01D 29/05 210/321.75 |
| 2010/0065486 A1* | 3/2010 | Assion | ................. B01D 29/012 210/232 |
| 2013/0146523 A1 | 6/2013 | Veit et al. | |

FOREIGN PATENT DOCUMENTS

| | | |
|---|---|---|
| CN | 203214216 U | 9/2013 |
| JP | 2013-545031 A | 12/2013 |

(Continued)

*Primary Examiner* — Madeline Gonzalez
(74) *Attorney, Agent, or Firm* — Morgan, Lewis & Bockius LLP

(57) ABSTRACT

A fuel filter for a vehicle may include an upper case with a fuel inlet at a first side; a main filter disposed in the upper case to filter fuel flowing between an inner surface of the upper case and an external diameter of the main filter; a lower case provided in a structure having a fuel outlet and joined with a second side of the upper case; a first auxiliary filter assembly installed between the upper case and the main filter to secondarily filter the fuel; and a second auxiliary filter assembly installed between the main filter and the lower case to secondarily filter the fuel.

10 Claims, 5 Drawing Sheets

(56) References Cited

FOREIGN PATENT DOCUMENTS

| KR | 10-2002-0016956 A | 3/2002 |
|----|-------------------|--------|
| KR | 10-0689081 B1 | 3/2007 |
| KR | 10-2009-0073483 A | 7/2009 |
| KR | 10-2013-0064301 A | 6/2013 |
| KR | 10-1470244 B1 | 12/2014 |

* cited by examiner

— FUEL BEFORE FILTERING
---- FUEL AFTER FILTERING

FUEL FILTER FOR VEHICLE

CROSS-REFERENCE TO RELATED APPLICATION

The present application claims priority to Korean Patent Application No. 10-2015-0083181 filed on Jun. 12, 2015, the entire contents of which is incorporated herein for all purposes by this reference.

BACKGROUND

Field of the Invention

The present invention relates to a fuel filter for a vehicle, and more particularly, to a fuel filter for a vehicle capable of extending an exchange cycle of fuel filter (particularly, a fuel filter for an FFV vehicle).

Description of Related Art

A fuel supply system for a vehicle basically includes a fuel tank storing fuel, a fuel pump conveying the fuel, a fuel filter filtering moisture and dust, and the like in the fuel, and a fuel pipe transferring the fuel from the fuel filter to an injector of the engine.

The fuel filter may filter foreign substances such as moisture and dust, and the like in the fuel and needs to be exchanged according to the lifespan cycle for achieving a normal filtering function.

Recently, as a kind of eco-friendly vehicle having a small carbon emission quantity, a flexible fuel vehicle (FFV) using a bio ethanol fuel has been manufactured, but the content of foreign substances is high as compared with general gasoline fuel and the frequent replacement of the fuel filter is required.

Further, in the case of the FFV, since moisture, chloride ions, and the like including acid due to deterioration of ethanol fuel are included, there is a problem in that the lifespan (exchange cycle) of the FFV fuel filter is further shortened.

As a result, in order to easily perform the frequent exchange of the fuel filter, as illustrated in FIGS. 1 and 2, an external fuel filter 10 installed with the fuel filter outside the fuel tank 30 is applied to the FFV, and a quick connector 18 of a fuel supply hose and a quick connector 18 of a fuel discharge hose are fastened to both sides of the external fuel filter 10, respectively.

The information disclosed in this Background of the Invention section is only for enhancement of understanding of the general background of the invention and should not be taken as an acknowledgement or any form of suggestion that this information forms the prior art already known to a person skilled in the art.

SUMMARY OF DISCLOSURE

Various aspects of the present invention are directed to providing a fuel filter for a vehicle in which first and second auxiliary filters in addition to a main filter may be further embedded by using fastening spaces of quick connectors which are connected to both sides of a fuel filter as the spaces for increasing the size of the fuel filter so that the filtering area of the fuel filter can be increased and the lifespan extension of the fuel filter can be ensured.

In one aspect, the present invention provides a fuel filter for a vehicle including: a upper case having a fuel inlet in one side; a main filter disposed in the upper case to filter fuel flowing between an inner surface of the upper case and an external diameter of the main filter; a lower case provided as a structure having a fuel outlet and joined with the other end of the upper case; a first auxiliary filter assembly installed between the upper case and the main filter for secondarily filtering the fuel; and a second auxiliary filter assembly installed between the main filter and the lower case for secondarily filtering the fuel.

In an exemplary embodiment, a concave quick connector insertion space is formed at a center of an outer surface of the upper case and a center of an outer surface of the lower case.

In another exemplary embodiment, a first projection space for embedding the first auxiliary filter assembly is formed at a circumference of the outer surface of the upper case, and a second projection space for embedding a second auxiliary filter assembly is formed at a circumference of the outer surface of the lower case.

In still another referred embodiment, the first auxiliary filter assembly, includes: a first support plate in which the main filter is joined to the inner surface thereof and a plurality of first fuel through holes are through-formed at an outer periphery; a first hollow fuel guide body which is integrally formed at the outer surface of the first support plate with a vertically bent cross section to be space apart from the inner surface of the upper case; and a first auxiliary filter which is installed between an outer end of the first support plate and an outer end of the first hollow fuel guide body to be spaced apart from the upper case.

In yet another exemplary embodiment, the inner surface of the support plate and one side of the main filter may be joined with each other by using a halogen fusing method.

In still yet another exemplary embodiment, the second auxiliary filter assembly, includes: a second support plate in which the main filter is joined to the inner surface thereof and a plurality of second fuel through holes are through-formed at an outer periphery; a second hollow fuel guide body which is integrally formed at the outer surface of the second support plate with a vertically bent cross section to be watertightly insert-fastened to the inner surface of the lower case; and a second auxiliary filter which is installed between an outer end of the second support plate and an outer end of the second hollow fuel guide body to be spaced apart from the upper case.

In a further exemplary embodiment, the inner surface of the second support plate and the other side of the main filter may be joined with each other by using a halogen fusing method.

In another further exemplary embodiment, the upper case and the lower case may be joined with each other by a heat fusing method.

According to the embodiment, the present invention provides the following effects.

First, since the first and second auxiliary filters in addition to the main filter can be further embedded by using the fastening spaces of the quick connectors which are connected to both sides of the fuel filter as the spaces for increasing the size of the fuel filter, the filtering area of the fuel filter may be increased, and as a result, the extension of the lifespan of the fuel filter can be ensured.

Second, the size of the fuel filter can be increased without an interference phenomenon with the fuel tank and the peripheral vehicle body by using the fastening spaces of the quick connectors which are connected to both sides of the fuel filter as the spaces for increasing the size of the fuel filter.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has at least two sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
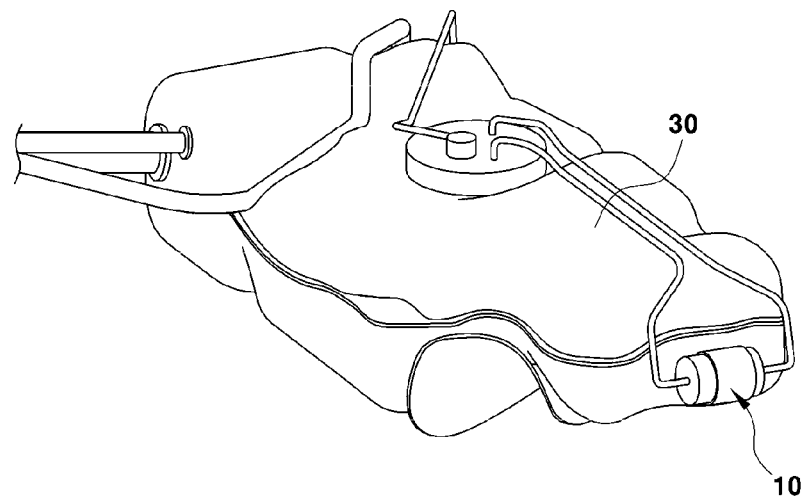
FIG. 1 and FIG. 2 are diagrams illustrating a structure installed with a fuel filter in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Here, a configuration and an operation flow for the external fuel filter in the related art will be described below.

Figure 3:
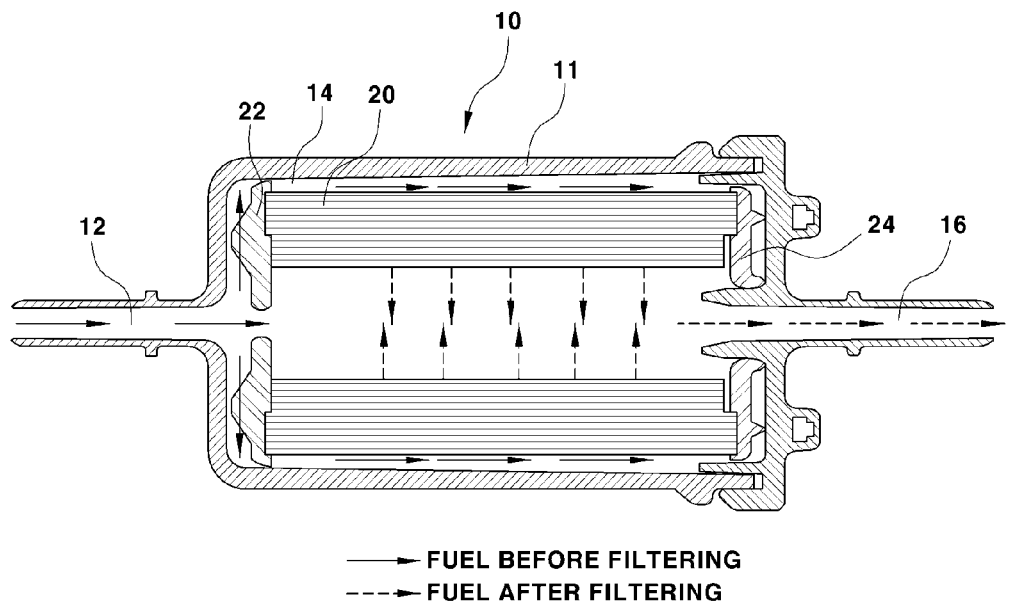
FIG. 3 is a cross-sectional view illustrating a fuel filter in the related art and a filtering process thereof.

FIG. 3 is a cross-sectional view illustrating a fuel filter and a filtering process thereof in the related art.

In FIG. 3, reference numeral 11 represents a housing of the fuel filter 10, and reference numeral 20 represents a main filter embedded in the housing.

The housing 11 is molded in a cylindrical shape and has a structure in which a fuel inlet 12 is formed at a front end and a fuel outlet 16 is formed at a rear end.

The main filter 20 has a cylindrical shape and a structure in which an upper cover 22 and a lower cover 24 are coupled with the front end and the rear end, respectively.

In this case, a space between the inner wall of the front end of the housing 11 and the upper cover 22 of the main filter 20 and a space between an inner surface of the housing 11 and an outer surface of the main filter 20 form a fuel flow space 14 in which fuel before filter flows.

Accordingly, the fuel before filtering which flows through the fuel inlet 12 of the housing 11 flows to the fuel flow space 14 and then is filtered by the main filter 20, and the filtered fuel is discharged to the engine through the fuel outlet 16 via the inner space of the main filter 20.

However, the fuel filter in the related art has the following problems.

First, in the case of the ethanol fuel used in the FFV, the content of foreign substances is high as compared with general gasoline fuel, and as a result, there is a problem in that a blocking phenomenon of the fuel filter frequently occurs and the fuel filter is frequently replaced.

Second, in order to solve the frequent replacement of the fuel filter, that is, to extend the lifespan of the fuel filter, a method of increasing a size (a diameter and a length) of the fuel filter can be applied, but since the fuel filter is applied in an external structure installed outside the fuel tank, there is a problem due to a layout in that the capacity of the fuel tank has no choice but to be reduced as much as the volume which increases the size of the fuel filter.

In other words, since the fuel filter is interfered from the outer surface of the fuel tank by increasing the diameter of the fuel filter and the interference with a side end and a peripheral vehicle body of the fuel tank is generated by excessively increasing the length of the fuel filter, the capacity of the fuel tank has no choice but to be reduced as much as the volume which increases the size of the fuel filter.

Third, when the capacity of the fuel tank is reduced as much as the volume which increases the size of the fuel filter, since the storage amount of fuel in the fuel tank has no choice but to be reduced, there is a problem in that the product value such as mileage reduction deteriorates.

Hereinafter, preferable embodiments of the present invention will be described in detail with reference to the accompanying drawings.

In an exemplary embodiment of the present invention, available spaces (see a dotted display unit of FIG. 2) for fastening a quick connector exist at both sides of a fuel filter, and the available spaces are used as spaces which may increase a size of the fuel filter, that is, spaces which may further embed first and second auxiliary filters besides a main filter.

In other words, in an exemplary embodiment of the present invention, a space (see a dotted display unit of FIG. 2) of a fastening part of the quick connector of an external fuel filter is used as the space which may increase the size of the fuel filter so that the size of the fuel filter is increased without interference with a fuel tanks and a capacity of the fuel tank is maintained.

Figure 4:
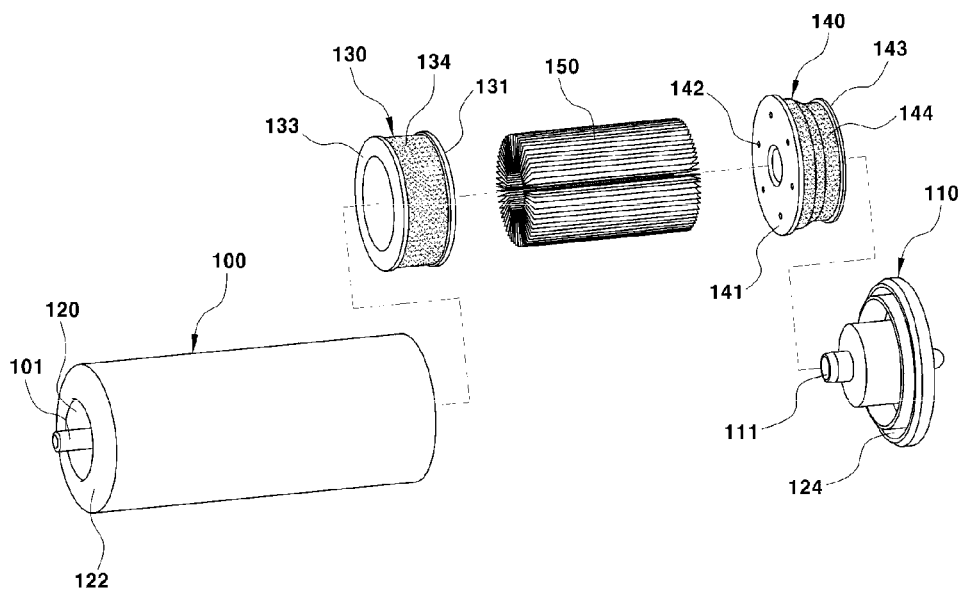
FIG. 4 is an exploded perspective view illustrating a fuel filter according to the present invention.
Figure 7:
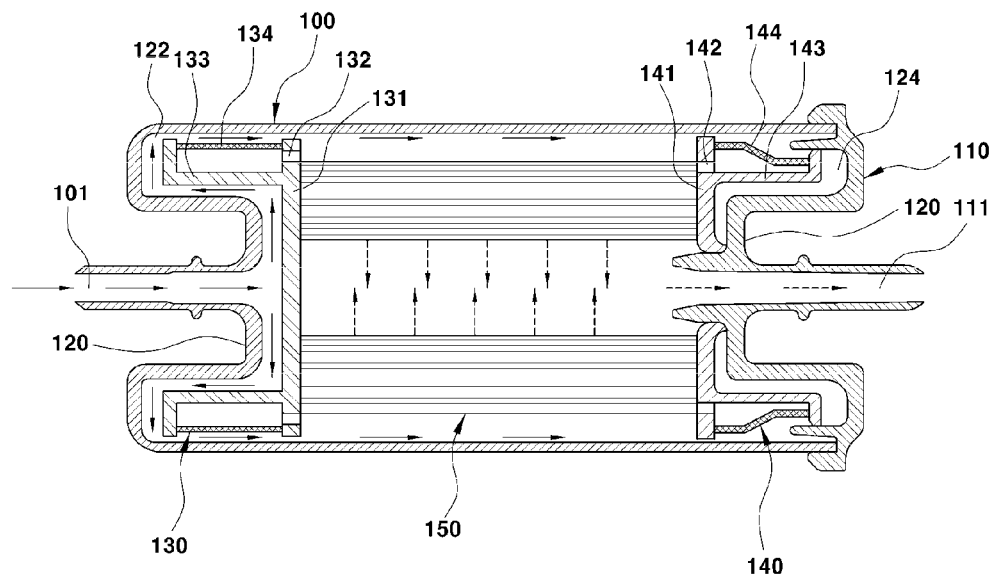
FIG. 7 is a cross-sectional view illustrating a filtering process of a main filter embedded in the fuel filter according to the present invention.
Figure 8:
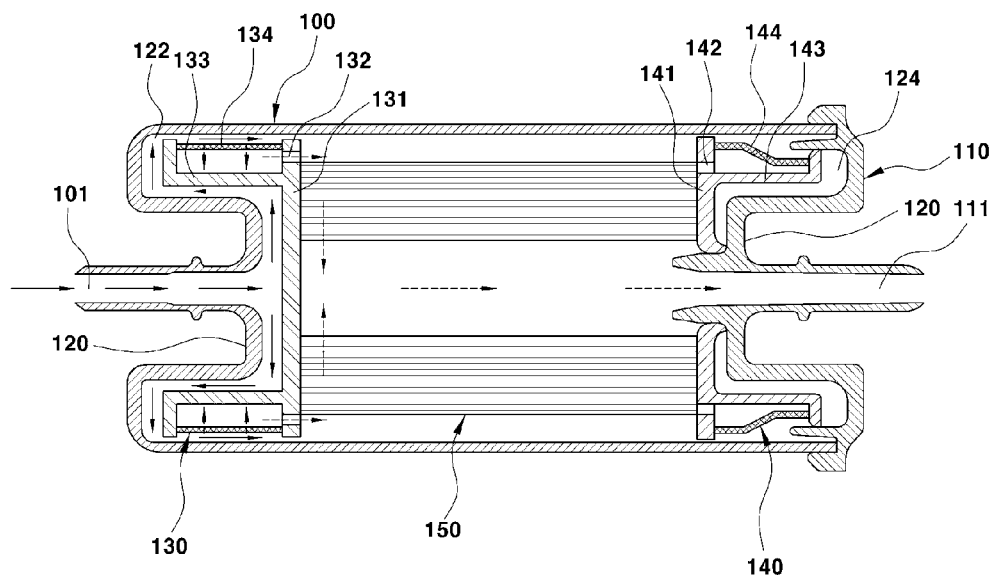
FIG. 8 is a cross-sectional view illustrating a filtering process of a first auxiliary filter embedded in the fuel filter according to the present invention.
Figure 9:
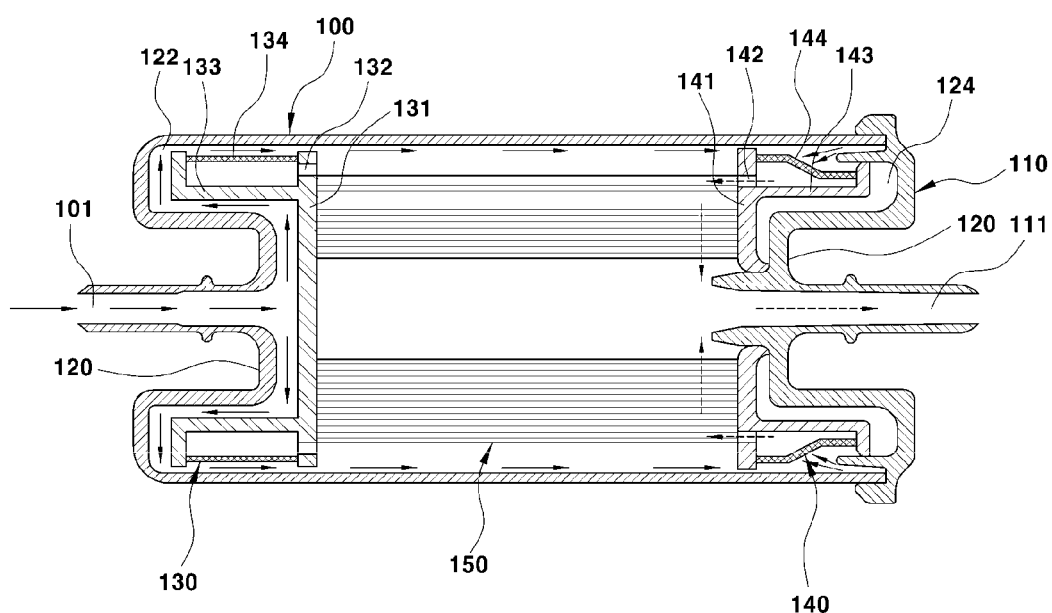
FIG. 9 is a cross-sectional view illustrating a filtering process of a second auxiliary filter embedded in the fuel filter according to the present invention.

FIG. 4 is an exploded perspective view illustrating a fuel filter for a vehicle according to an exemplary embodiment of the present invention, and FIGS. 7 to 9 illustrate cross-sectional views.

In FIGS. 4 and 7 to 9, reference numeral 100 represents an upper case, and reference numeral 110 represents a lower case.

The upper case 100 and the lower case 110 as a housing configuration of the fuel filter serve as a frame body of an external fuel filter which is installed on the outside of the fuel tank.

A fuel inlet 101 into which fuel from the fuel tank flows is formed at one side of the upper case 100, and a quick connector of a fuel supply hose extended from the fuel tank is fastened to the fuel inlet 101.

Further, a fuel outlet 111 to which filtered fuel is discharged is formed at one side of the lower case 110, and a quick connector of a fuel discharge hose which supplies the filtered fuel to the engine is fastened to the fuel outlet 111.

Preferably, a concave quick connector insertion space 120 is formed at a center of an outer surface of the upper case 100 and a center of an outer surface of the lower case 110, and since the quick connector is inserted into the quick connector insertion space 120 and fastened to both sides of the fuel filter, a fastened position of the quick connector is formed at the same position as the related art.

As a result, since the quick connector is fastened at the same position as the related art, interference between the quick connector and the fuel tank does not occur.

Further, a first projection space 122 for embedding a first auxiliary filter assembly 130 is formed at an edge of the quick connector insertion space 120 of the upper case 100, that is, a circumference of the outer surface of the upper case 100, and a second projection space 124 for embedding a second auxiliary filter assembly 140 is formed at a circumference of the outer surface of the lower case 110.

Figure 2:
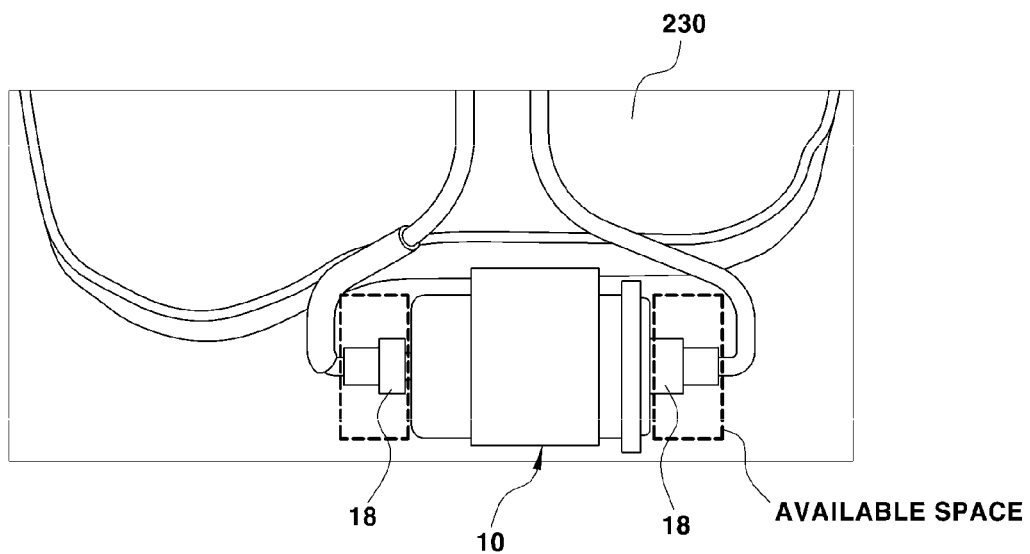

Referring to a dotted portion of FIG. 2, since the first projection space 122 of the upper case 100 and the second projection space 124 of the lower case 110 are configured in an edge space (an available space as an existing quick connector fastening space) of the quick connector 18, in the first projection space 122 and the second projection space 124, interference with the fuel tank or a vehicle body around the fuel tank does not occur.

Referring to FIGS. 7 to 9, a main filter 150 having a cylindrical structure is disposed in the filter while the upper case 100 and the lower case 110 are joined to each other.

In this case, a separation space for a fuel flow is formed between an external diameter of the main filter 150 and an inner wall of the upper case 100, and fuel supplied to the separation space has a flow filtered to a central space of the main filter 150.

While the main filter 150 is disposed in the upper case 100, the first auxiliary filter assembly 130 is installed between the inner wall of the upper case 100 and one side of the main filter and serves to secondarily filter the fuel.

Further, while the main filter 150 is disposed in the upper case 100, the second auxiliary filter assembly 140 is installed between the other side of the main filter and the inner wall of the lower case 110 and serves to secondarily filter the fuel.

Figure 5:
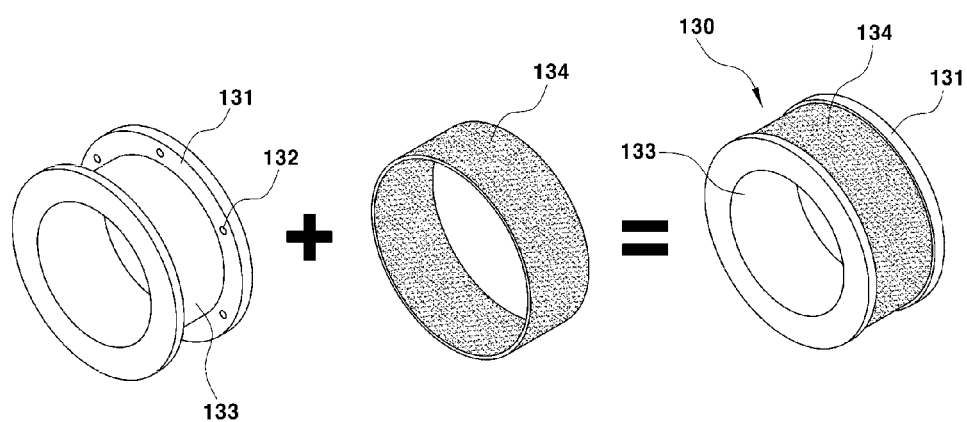
FIG. 5 is a perspective view illustrating a first auxiliary filter assembly of the fuel filter according to the present invention.

Referring to FIG. 5, the first auxiliary filter assembly 130 is configured to include a first support plate 131, a first fuel guide body 133 integrally formed on an outer surface of the first support plate 131, and a first auxiliary filter 134 installed between the first support plate 131 and the first fuel guide body 133.

The first support plate 131 is provided as a disk structure in which an inner surface thereof is joined with one side of the main filter 150 and a plurality of first fuel through holes 132 are through-formed at an outer periphery contacting the main filter 150.

Further, the first fuel guide body 133 is integrally formed at the outer surface of the first support plate 131 with a vertically bent cross section to be spaced apart from the inner surface of the upper case 100 to have a hollow cylindrical structure.

Further, the first auxiliary filter 134 is installed between an outer end of the first support plate 131 and an outer end of the first fuel guide body 133 so as to filter the fuel to be spaced apart from the inner surface of the upper case 100.

The outer surfaces of the first support plate 131 and the first fuel guide body 133 and the inner wall of the upper case 100 among configurations of the first auxiliary filter assembly 130 having the above configuration are spaced apart from each other in order to ensure a fuel flow space.

Particularly, the first fuel guide body 133 and the first auxiliary filter 134 of the first auxiliary filter assembly 130 are embedded in the first projection space 122 of the upper case 100.

Figure 6:
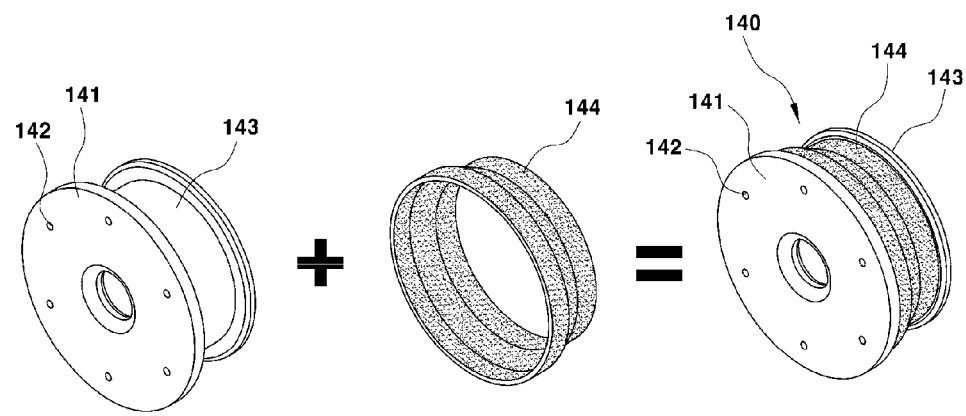
FIG. 6 is a perspective view illustrating a second auxiliary filter assembly of the fuel filter according to the present invention.

Referring to FIG. 6, the second auxiliary filter assembly 140 is configured to include a second support plate 141, a second fuel guide body 143 integrally formed on an outer surface of the second support plate 141, and a second auxiliary filter 144 installed between the second support plate 141 and the second fuel guide body 143.

The second support plate 141 is provided as a disk structure in which an inner surface thereof is joined with the other side of the main filter 150 and a plurality of second fuel through holes 142 are through-formed at an outer periphery contacting the main filter 150.

Further, the second fuel guide body 143 is integrally formed at the outer surface of the second support plate 141 with a vertically bent cross section to be watertightly inserted and fastened to the inner surface of the lower case 110 to have a hollow cylindrical structure.

Further, the second auxiliary filter 144 is installed between an outer end of the second support plate 121 and an outer end of the second fuel guide body 123 so as to filter the fuel to be spaced apart from the inner surface of the upper case 100.

Particularly, the second fuel guide body 143 of the second auxiliary filter assembly 140 is embedded and insert-fastened in the second projection space 124 of the lower case 110.

Here, an assembling method of the fuel filter of the present invention will be described below.

First, the inner surface of the first support plate 131 of the first auxiliary filter assembly 130 and one side of the main filter 150 are joined with each other by using a halogen fusing method. Further, the inner surface of the second support plate 141 of the second auxiliary filter assembly 140 and the other side of the main filter 150 are joined with each other by using the halogen fusing method.

Next, the second fuel guide body 143 of the second auxiliary filter assembly 140 is watertightly insert-fastened in the second projection space 124 of the lower case 110.

Next, the other end of the upper case 100 is joined to the inner side of the lower case 110 by a heat fusing method while the main filter 150 and the first and second auxiliary filter assemblies 130 and 140 joined to each other are embedded in the upper case 100.

In this case, a quick connector of a fuel supply hose extended from the fuel tank is fastened to the fuel inlet 101 formed at one side of the upper case 100, a quick connector of a fuel discharge hose supplying the fuel to the engine is fastened to the fuel outlet 111 formed at one side of the lower case 110, and as a result, the fuel filter of the present invention is completely installed on the outside of the fuel tank.

Here, a fuel filtering process by the fuel filter of the present invention will be described below.

FIG. 7 is a cross-sectional view illustrating a filtering process of the main filter embedded in the fuel filter according to an exemplary embodiment of the present invention.

As illustrated in FIG. 7, first, when the fuel from the fuel tank flows through the fuel inlet 101 of the upper case 100, passes through the first auxiliary filter assembly 130, and reaches between the inner surface of the upper case 100 and an external diameter of the main filter 150, the fuel is filtered by the main filter 150.

Next, the fuel filtered by the main filter 150 is discharged to the engine through the fuel outlet 111 of the lower case 110.

FIG. 8 is a cross-sectional view illustrating a filtering process of the first auxiliary filter embedded in the fuel filter according to an exemplary embodiment of the present invention.

As illustrated in FIG. 8, when the fuel from the fuel tank flows through the fuel inlet 101 of the upper case 100, passes through a space between the first support plate 131 of the first auxiliary filter assembly 130, the outer surface of the first fuel guide body 133, and the inner wall of the upper case 100, and reaches between the inner surface of the upper case 100 and the outer surface of the first auxiliary filter 134, the fuel is filtered by the first auxiliary filter 134.

Next, the fuel filtered by the first auxiliary filter 134 passes through the first fuel through hole 132 formed at the first support plate 131, passes through the main filter 150 again, and then is discharged to the engine through the fuel outlet 111 of the lower case 110.

In this case, since the fuel entering the main filter 150 through the first fuel through hole 132 is filtered by the first auxiliary filter 134 in advance, even though the fuel enters the main filter 150, the main filter 150 is not contaminated.

FIG. 9 is a cross-sectional view illustrating a filtering process of the second auxiliary filter embedded in the fuel filter according to an exemplary embodiment of the present invention.

As illustrated in FIG. 9, when the fuel from the fuel tank flows through the fuel inlet 101 of the upper case 100, passes through the first auxiliary filter assembly 130 and the main filter 150, and reaches between the inner surface of the upper case 100 and the outer surface of the second auxiliary filter 144, the fuel is filtered by the second auxiliary filter 144.

Next, the fuel filtered by the second auxiliary filter 144 passes through the second fuel through hole 142 formed at the second support plate 141, passes through the main filter 150 again, and then is discharged to the engine through the fuel outlet 111 of the lower case 110.

In this case, since the fuel entering the main filter 150 through the second fuel through hole 142 is filtered by the second auxiliary filter 144 in advance, even though the fuel enters the main filter 150, the main filter 150 is not contaminated.

As such, since the fuel from the fuel tank is filtered by the first auxiliary filter 134 and the second auxiliary filter 144 in addition to the main filter 150, a filtering area of the fuel may be increased and a lifespan of the fuel filter may be extended by increasing the filtering area.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel filter for a vehicle, comprising:
    an upper case with a fuel inlet formed at a center of a front end thereof;
    a main filter disposed in the upper case to filter fuel flowing between an inner surface of the upper case and an external diameter of the main filter;
    a lower case having a fuel outlet and joined with a rear side of the upper case;
    a first auxiliary filter assembly installed between the upper case and the main filter to filter the fuel; and
    a second auxiliary filter assembly installed between the main filter and the lower case to filter the fuel,
    wherein a concave quick connector insertion space is formed between an outer surface of the fuel inlet and an inner surface of a circumference of the upper case at the center of the front end of the upper case.

2. The fuel filter for the vehicle of claim 1, wherein a first projection space for embedding the first auxiliary filter assembly is formed at a circumference of an inner surface of the upper case, and a second projection space for embedding the second auxiliary filter assembly is formed at a circumference of an inner surface of the lower case.

3. The fuel filter for the vehicle of claim 1, wherein the first auxiliary filter assembly comprises:
    a first support plate in which the main filter is joined to an inner surface thereof and a plurality of first fuel through holes are through-formed at an outer periphery thereof;
    a first hollow fuel guide body which is integrally formed at an outer surface of the first support plate with a cross section to be spaced apart from the inner surface of the upper case; and
    a first auxiliary filter which is installed between an outer end of the first support plate and an outer end of the first hollow fuel guide body to be spaced apart from the upper case.

4. The fuel filter for the vehicle of claim 3, wherein the inner surface of the first support plate and a side of the main filter are joined with each other by using a halogen fusing method.

5. The fuel filter for the vehicle of claim 1, wherein the second auxiliary filter assembly comprises:

a second support plate in which the main filter is joined to an inner surface thereof and a plurality of second fuel through holes are through-formed at an outer periphery thereof;

a second hollow fuel guide body which is integrally formed at an outer surface of the second support plate with a cross section to be watertightly insert-fastened to the inner surface of the lower case; and a second auxiliary filter which is installed between an outer end of the second support plate and an outer end of the second hollow fuel guide body to be spaced apart from the upper case.

6. The fuel filter for the vehicle of claim 5, wherein the inner surface of the second support plate and a side of the main filter are joined with each other by using a halogen fusing method.

7. The fuel filter for the vehicle of claim 1, wherein the upper case and the lower case are joined with each other by a heat fusing method.

8. A fuel filter for a vehicle, comprising:

an upper case with a fuel inlet at a front end thereof;

a main filter disposed in the upper case to filter fuel flowing between an inner surface of the upper case and an external diameter of the main filter;

a lower case having a fuel outlet and joined with a rear side of the upper case; and a first auxiliary filter assembly installed between the upper case and the main filter to filter the fuel, wherein a first projection space for embedding the first auxiliary filter assembly is spaced from an outer surface of the fuel inlet to be formed at a circumference of an inner surface of the upper case to form a concave quick connector insertion space between an outer surface of the fuel inlet and the inner surface of the upper case.

9. The fuel filter for the vehicle of claim 8, further comprising:

a second auxiliary filter assembly installed between the main filter and the lower case to filter the fuel, wherein a second projection space for embedding the second auxiliary filter assembly is spaced from an outer surface of the fuel outlet to be formed at a circumference of an inner surface of the lower case.

10. A fuel filter for a vehicle, comprising:

an upper case with a fuel inlet formed at a center of a front end thereof;

a main filter disposed in the upper case to filter fuel flowing between an inner surface of the upper case and an external diameter of the main filter;

a lower case having a fuel outlet and joined with a rear end of the upper case;

a first auxiliary filter assembly installed between the upper case and the main filter to filter the fuel; and a second auxiliary filter assembly installed between the main filter and the lower case to filter the fuel, wherein a concave quick connector insertion space is formed between an outer surface of the fuel outlet and an inner surface of a circumference of the lower case at a center of a rear end of the lower case.

* * * * *